United States Patent
Otake et al.

(10) Patent No.: US 8,042,270 B2
(45) Date of Patent: Oct. 25, 2011

(54) METHOD OF MANUFACTURING HOSE COUPLING FITTING

(75) Inventors: Katsuya Otake, Aichi-ken (JP);
Hidekazu Miyazaki, Aichi-ken (JP);
Katsuji Iwamoto, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 679 days.

(21) Appl. No.: 12/213,899

(22) Filed: Jun. 26, 2008

(65) Prior Publication Data
US 2009/0008933 A1    Jan. 8, 2009

(30) Foreign Application Priority Data
Jul. 4, 2007    (JP) .................................. 2007-175728

(51) Int. Cl.
*B21D 51/16*    (2006.01)
(52) U.S. Cl. ................ 29/890.144; 29/557; 29/890.142
(58) Field of Classification Search ............. 29/890.144, 29/557, 890.14, 890.141, 890.142; 72/335, 72/367.1, 368
See application file for complete search history.

(56) References Cited

U.S. PATENT DOCUMENTS
6,189,199 B1 *   2/2001   Ouchi et al. ................... 29/557

FOREIGN PATENT DOCUMENTS
| JP | A-61-259851 | 11/1986 |
| JP | A-04-094837 | 3/1992 |
| JP | A-09-122795 | 5/1997 |
| JP | A-2002-361359 | 12/2002 |

* cited by examiner

*Primary Examiner* — David Bryant
*Assistant Examiner* — Moshe Wilensky
(74) *Attorney, Agent, or Firm* — Posz Law Group, PLC

(57) ABSTRACT

A hose coupling fitting is furnished with a coupling head portion having a connecting hole, and a nipple portion having a nipple hole, and is fabricated through sequential cold forging steps carried out on a rod material. Specifically, a first pilot hole is formed along the center axis from a first end of the rod material, and a second pilot hole is formed along the center axis from the other end of the rod material. The second pilot hole is connected to the first pilot hole, and is formed with smaller diameter than the first pilot hole and larger diameter than the nipple hole. The surrounding area of the second pilot hole is then worked to form the nipple portion.

10 Claims, 6 Drawing Sheets

METHOD OF MANUFACTURING HOSE COUPLING FITTING

This application claims the benefit of and priority from Japanese Application No. 2007-175728 filed Jul. 4, 2007, the content of which is incorporated herein by reference.

BACKGROUND OF THE INVENTION

1. Field of the Invention

The present invention relates to a method of manufacturing a hose coupling fitting for connecting various kinds of hoses for fluids, such as automotive brake hoses.

2. Description of the Related Art

Conventional hose coupling fittings of this kind are furnished with a coupling head portion having a connection opening and a coupling body which has a nipple portion; a line on the brake cylinder side is connected to the connection opening, and a hose on the master cylinder side is inserted into and connected with the nipple portion to connect the master cylinder with the brake cylinder. In a hose coupling fitting of this design, the nipple portion is a thin elongated pipe which inserts into the path of the hose and which must be worked to high dimensional accuracy. For this reason the part is typically manufactured by a cutting operation, or by producing a separate component and unifying this with the coupling body by welding.

In this regard, with a view to manufacturing a hose coupling fitting of simpler design composed of single component without the need for a cutting process, methods which simply entail a series of cold forging steps have been considered; one such known technique is disclosed in JP 2002-361359 A. In this conventional technique, a large-diameter bore is formed in a thick, short rod-shaped material which then undergoes several cold forging steps to produce the connection opening and the nipple portion. However, in a conventional hose coupling fitting of ferrule shape having a socket portion and a nipple portion, appreciable deformation is necessary in order to transform the large-diameter through-bore into a narrow and elongated nipple hole, and it is difficult in practice for uniform shaping to take place between the upper end face and the lower end face of the nipple hole, thus creating the problem of appreciable deviation in the inside diameter dimension due to inside diameter taper or rippling, and making it difficult to achieve the desired shape.

SUMMARY

An advantage of some aspects of the invention is to provide a hose coupling fitting whose nipple portion can be produced with a high degree of accuracy through a series of cold forging steps.

In order to achieve the stated object at least in part, it is possible for the present invention to be reduced to practice as the embodiments shown below.

According to an aspect of the invention is provided with a method of manufacturing a hose coupling fitting comprising: a coupling head portion having a connecting hole for connection to a pipe; and a nipple portion having a nipple hole for connection to a hose. The method comprises: a plurality of sequentially performed cold forging steps carried out on a column-shaped rod material. The plurality of steps include: forming a first pilot hole which extends along a center axis of the rod material from an end of the rod material to form the connecting hole, and forming a second pilot hole which extends along the center axis of the rod material from the other end of the rod material to form the nipple hole; and forming the coupling head portion by forging a portion surrounding the first pilot hole, and the nipple portion by forging a portion surrounding the second pilot hole. The second pilot hole is connected to the first pilot hole, and is formed with smaller diameter than the first pilot hole and larger diameter than the nipple hole.

In a preferred embodiment, the coupling head portion having the connecting hole and the nipple portion having the nipple hole are formed through cold forging of the rod material of circular cylinder shape. Specifically, through cold forging, a first pilot hole for forming the connecting hole is formed along the center axis of the rod material from a first end of the rod material, and a second pilot hole is formed along the center axis of the rod material from the other end of the rod material. The second pilot hole is formed with smaller diameter than the first pilot hole and larger diameter than the nipple hole. At this point the second pilot hole may be formed so as to connect to the first pilot hole at one time, or to connect with it multiple stages. Next, a working process is carried out to make the portion surrounding the first pilot hole into the coupling head portion, and to make the portion surrounding the second pilot hole into the nipple portion.

According to another embodiment, the hose coupling fitting can be formed simply through a series of steps involving cold forging of the rod material, and thus no cutting step is required, thereby affording a simpler working process and excellent productivity. Moreover, since it suffices for the second pilot hole to be bored through a solid section of the rod material equal in length to the total length of the rod material minus the depth of the first pilot hole, its passage length can be shorter, the load on the punch and pin can be reduced, and the desired shape can be produced easily with high accuracy. Additionally, since the second pilot hole is formed prior to working of the nipple portion, due the absence of work hardening in the surrounding area, a long narrow nipple hole can be formed easily in the rod material with reduced load on the punch and pin.

In the method of manufacturing a hose coupling fitting of another embodiment, there can be employed a step wherein, where the inside diameter of the second pilot hole is denoted as d5 and the inside diameter of the nipple hole is denoted as d3, d5/d3 is set to between 1.1 and 3, preferably between 1.2 and 2. The reason is that if d5/d3 exceeds 3, a high degree of working will be needed to reduce the diameter of the second pilot hole to that of the nipple hole, making it difficult to work the material into the desired shape.

As another embodiment, there can be employed a step wherein the second pilot hole is formed by forming a recess along the center axis, then punching through the center portion along the center axis to connect with the first pilot hole.

Best Mode for Carrying Out the Invention

These and other objects, features, aspects, and advantages of the present invention will become more apparent from the following detailed description of the preferred embodiments with the accompanying drawings.

DESCRIPTION OF THE PREFERRED EMBODIMENTS (1) General Configuration of Hose Coupling Fitting 10

Figure 1:
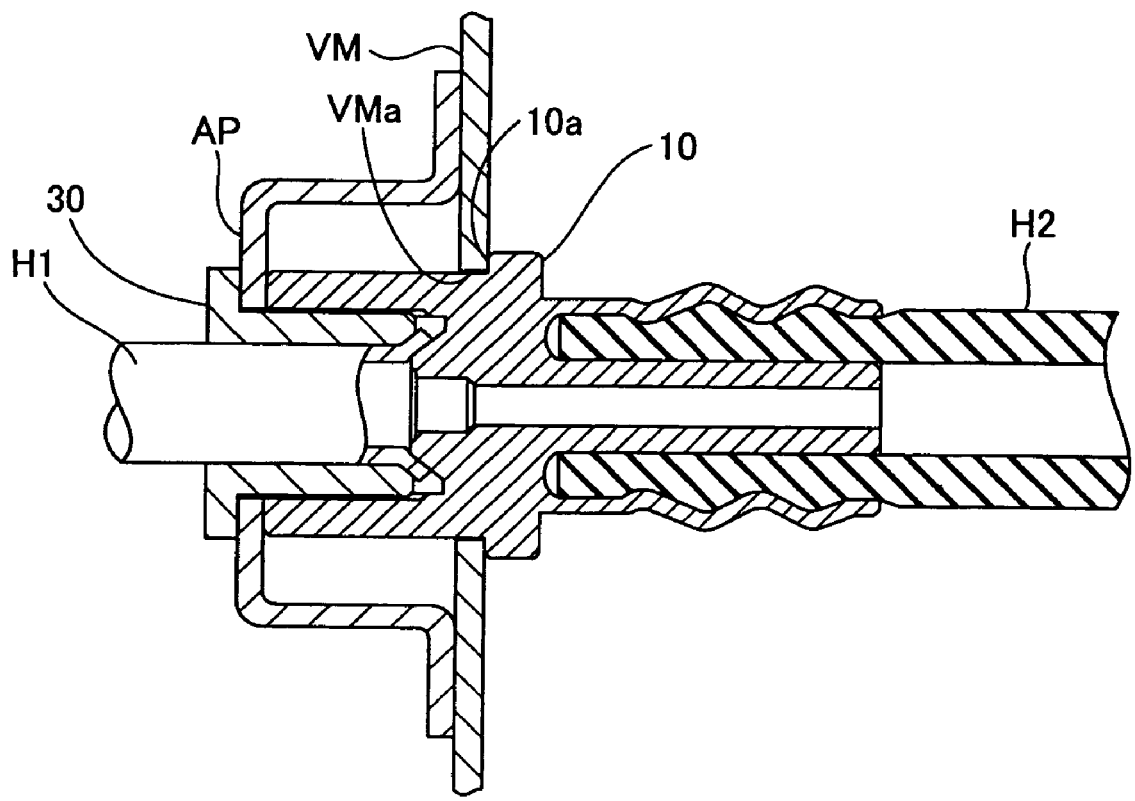
FIG. 1 is a sectional view of a hose coupling fitting pertaining to an embodiment of the present invention, connecting a pipe to a hose.

FIG. 1 is a sectional view of a hose coupling fitting 10 used to connect a pipe H1 to a hose H2 pertaining to an embodiment of the present invention. The hose coupling fitting 10 is used for connection of an automotive brake hose or the like; the pipe H1 is connected through threadable attachment of a fastening member 30, while at the other side of the hose coupling fitting 10, the hose H2 is connected through swaging with the hose H2 pressure-fit therein. The hose coupling fitting 10 is mounted onto a mounting member VM via a mounting fitting AP by positioning a mounting hole VMa of the mounting member VM on a mounting shoulder portion 10a which has been disposed in the outside peripheral edge part of the hose coupling fitting 10.

(2) Configuration of Hose Coupling Fitting 10

Figure 2:
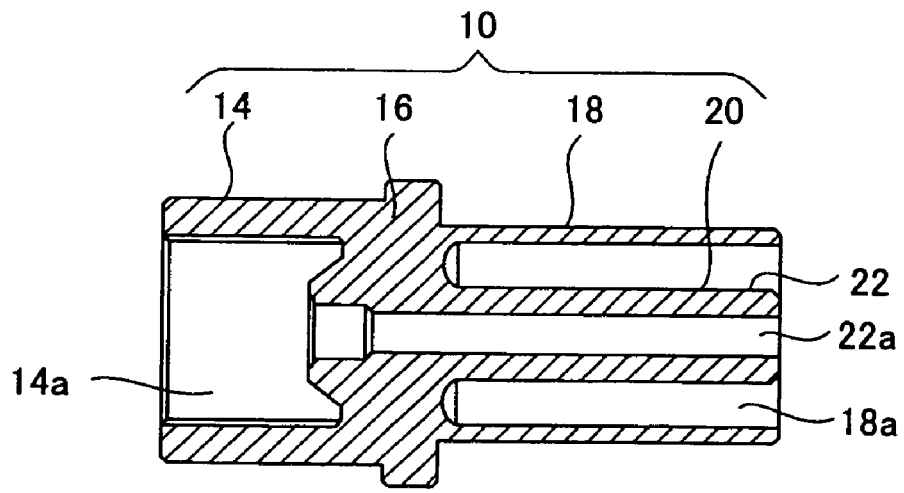
FIG. 2 is a sectional view showing the hose coupling fitting prior to connection of the pipe and the hose in FIG. 1.

The configuration of the various parts of the hose coupling fitting 10 will be described in detail. FIG. 2 is a sectional view showing the hose coupling fitting 10 prior to connection of the pipe H1 and the hose H2 in FIG. 1. The hose coupling fitting 10 includes a coupling head portion 14, a dividing wall 16, a socket portion 18, and a nipple portion 20 which are integrally formed from metal material. In the interior of the hose coupling fitting 10 there are formed holes which extend in the axial direction for attachment of the pipe H1 and the hose H2 shown in FIG. 1; the holes are separated by the dividing wall 16, that is, a connecting hole 14a for attachment of the pipe H1 is formed in the coupling head portion 14, while a socket hole 18a for attachment of the hose H2 is formed in the socket portion 18 and the nipple portion 20. The socket portion 18 is the part in which the hose H2 is connected through swaging diametrically inward from the outside peripheral portion thereof with the hose H2 (FIG. 1) inserted into the socket hole 18a. The nipple portion 20 has a pipe body 22 which projects from the dividing wall 16 for pressure-fitting the hose H2. A nipple hole 22a for connecting the pipe H1 and the hose H2 is formed through the center of the pipe body 22 and the dividing wall 16. The pipe body 22 is pressure-fit into the hose H2, and the hose H2 is then connected by swaging the socket portion 18 from the outside peripheral side.

Figure 3:
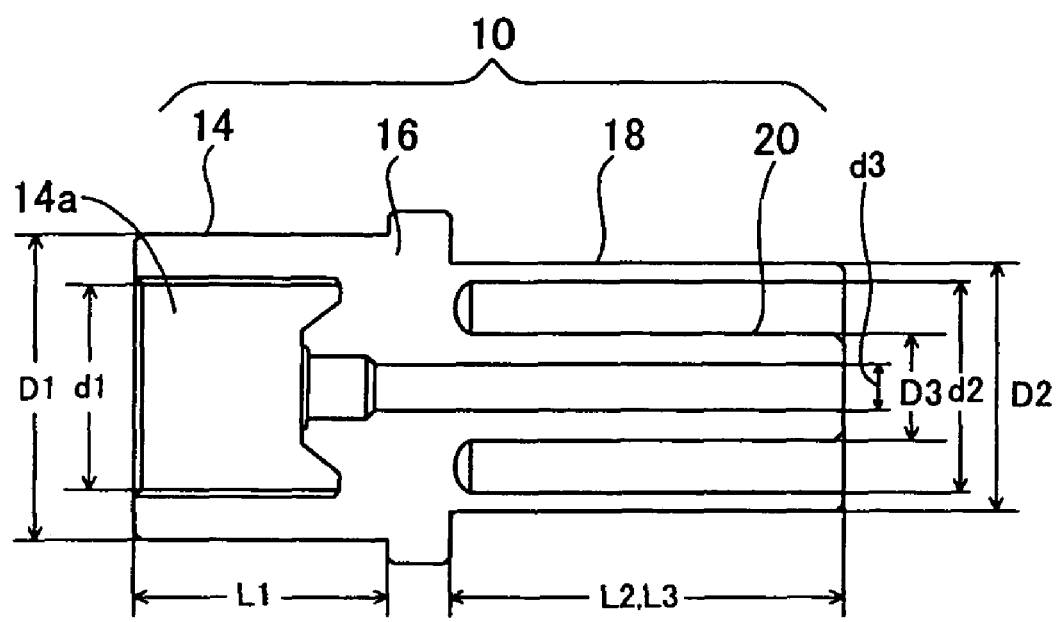
FIG. 3 shows the dimensions of a hose coupling fitting.

As shown in FIG. 3, exemplary dimensions for the various parts are, in the coupling head portion 14, length L1 of 11.5 mm, outside diameter D1 of 15 mm, and connecting hole 14a inside diameter d1 of 9.5 mm. In the socket portion, length L2 may be 17 mm, outside diameter D2 may be 13.5 mm, and inside diameter d2 may be 11.3 mm; while in the nipple portion 20, length L3 may be the same as the socket portion 18, while outside diameter D3 may be 3.6 mm, and inside diameter d3 may be 2.2 mm.

(3) Manufacturing Process of Hose Coupling Fitting 10

Figure 4A:
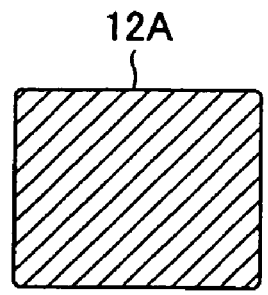
FIGS. 4A through 4D show the manufacturing process of a hose coupling fitting.
Figure 4B:
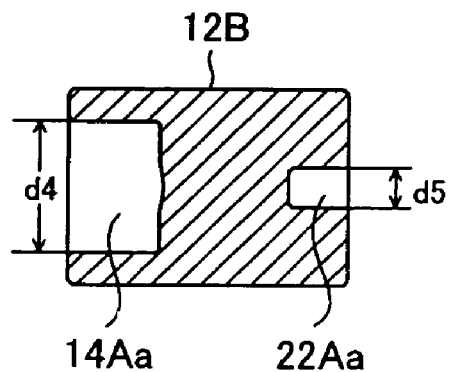
Figure 4C:
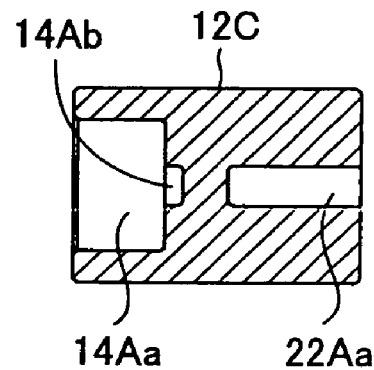

The process for manufacturing the hose coupling fitting 10 through a cold forging process will now be described. FIGS. 4 and 5 show the cold forging process of the hose coupling fitting 10. The hose coupling fitting 10 is manufactured from a single rod material through a plurality of cold forging steps. First, a rod material 12A of metal material shown in FIG. 4A is set in a die (not shown), and recesses which will ultimately serve as a first pilot hole 14Aa and a second pilot hole 22Aa are formed in the rod material 12A as shown in FIG. 4B, producing a workpiece 12B. The first pilot hole 14Aa is a hole used to form the connecting hole 14a (FIG. 2); its inside diameter d4 is substantially identical to the inside diameter d1 of the connecting hole 14a. The second pilot hole 22Aa is a hole used to form the nipple hole 22a; its inside diameter d5 is smaller than the inside diameter d4 of the first pilot hole 14Aa, and larger than the inside diameter d3 of the nipple hole 22a, e.g. 3 mm. Next, as shown in FIG. 4C, a recess 14Ab is formed in the center of the first pilot hole 14Aa and the second pilot hole 22Aa is increased in depth to produce a workpiece 12C; then, as shown in FIG. 4D, the second pilot hole 22Aa is extended and punched through to connect with the first pilot hole 14Aa to produce a workpiece 12D.

Figure 4D:
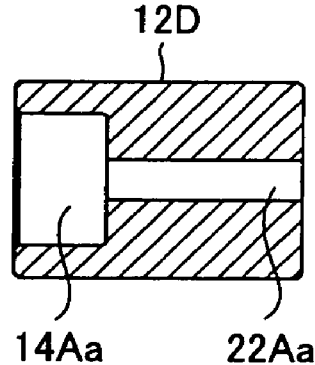
Figure 5A:
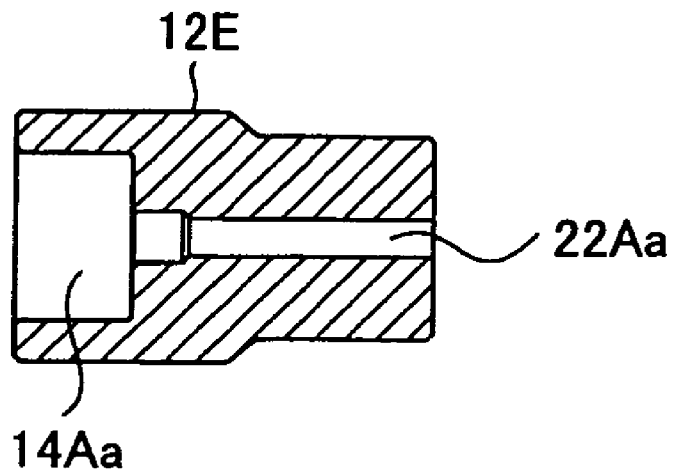
FIGS. 5A through 5C show the manufacturing process continued from FIG. 4.
Figure 6A:
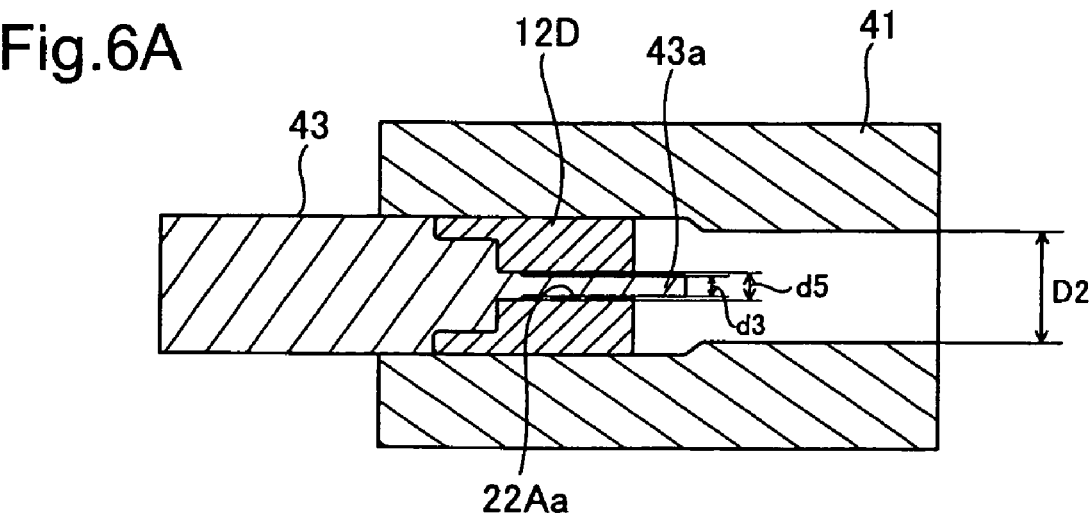
FIGS. 6A through 6B show the cold forging process.
Figure 6B:
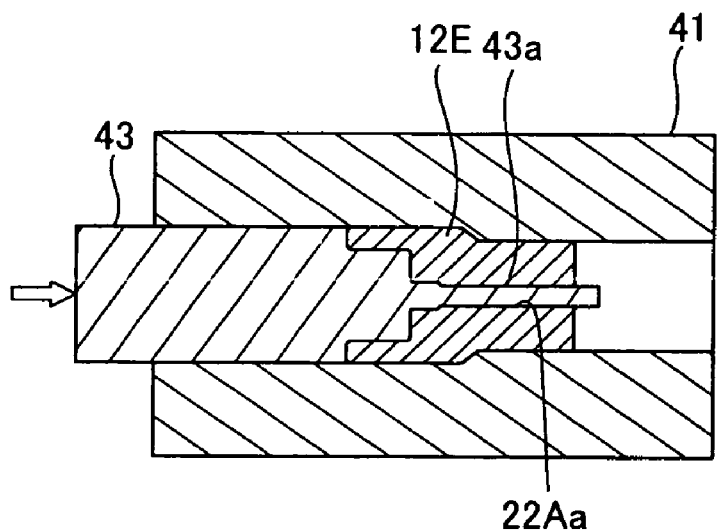

Next, the workpiece 12D of FIG. 4D is worked to produce a workpiece 12E shown in FIG. 5A. FIG. 6A depicts the cold forging process; the workpiece 12D is arranged in a die 41 and punch 43. At this point, since the pin 43a of the punch 43 is formed with diameter substantially the same as the inside diameter d3 of the nipple hole 22a but smaller than the inside diameter d5 of the second pilot hole 22Aa, there will be gap between it and the second pilot hole 22Aa. Then, the workpiece 12D is extruded forward by the punch 43 as shown in FIG. 6B. By so doing, the workpiece 12D is cold-forged into the shape of the workpiece 12E, that is, the section shown at right in the drawing is reduced in diameter until it equals the outside diameter of the socket portion 18, and the second pilot hole 22Aa equals that of the pin 43a.

Figure 5B:
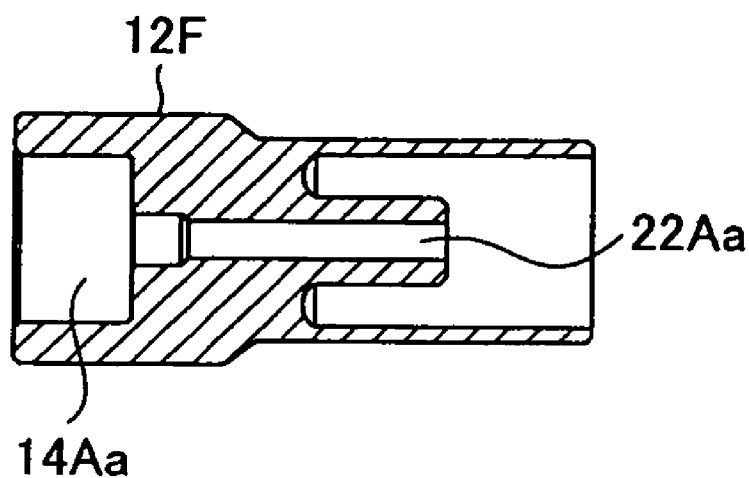
Figure 5C:
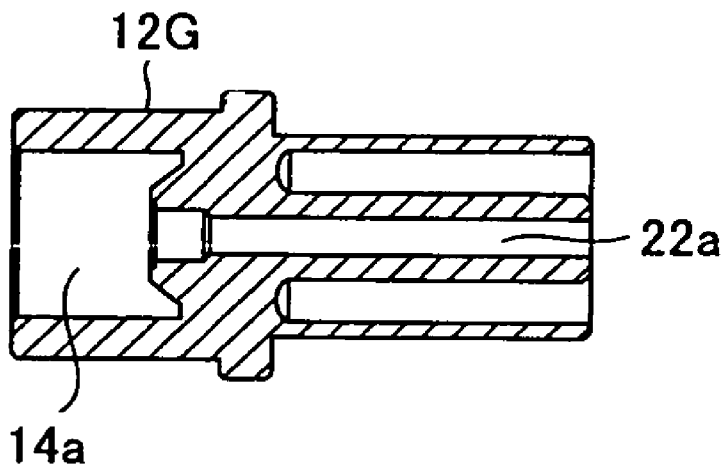
Figure 7A:
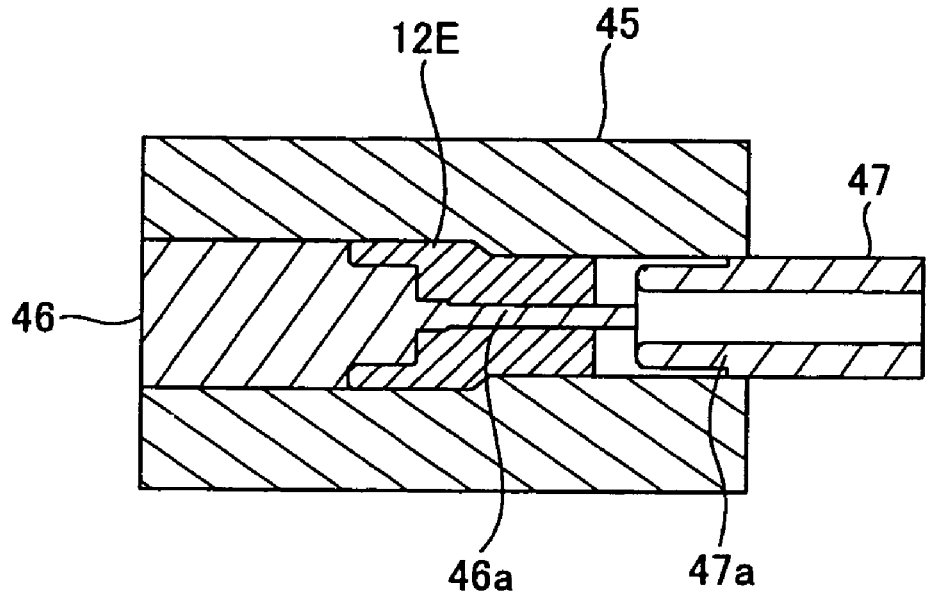
FIGS. 7A through 7B show the cold forging process continued from FIG. 6B.
Figure 7B:
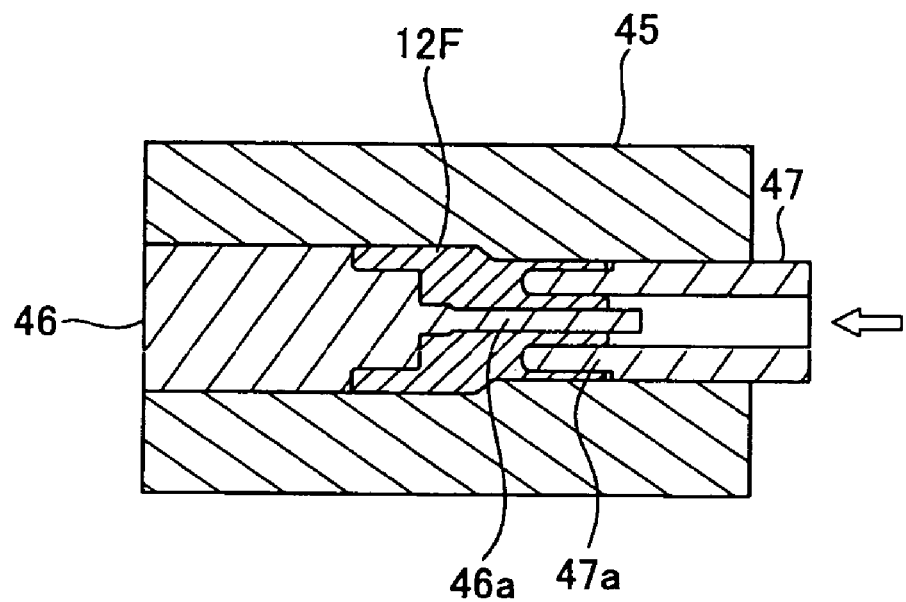

Subsequently, the workpiece 12E of FIG. 5A is worked to produce a workpiece 12F shown in FIG. 5B. FIG. 7A depicts the cold forging process with the workpiece 12E having been set in dies 45, 46. The die 46 has a pin 46a. The pin 46a is a rod shaped member of outside diameter equal to the inside diameter d3 of the nipple hole 22a. Meanwhile, the punch 47 is provided with a circular pipe portion 47a which is positioned concentric to the pin 46a. The pipe portion 47a is the section in which the socket hole 18a is formed, and is defined by a tubular body of outside diameter equal to the inside diameter d2 of the socket hole 18a. The workpiece 12E is then extruded forward by the punch 47 as shown in FIG. 7B. The workpiece 12E is thereby worked into the workpiece 12F. The workpiece 12F is then worked with a die and punch (not shown) into the workpiece 12G (FIG. 5C), that is, to the length of the socket portion 18 and the length of the nipple portion 20 shown in FIG. 2. Then, by way of an after-treatment, a screw thread or the like is formed in the workpiece 12G, to obtain the hose coupling fitting 10.

(4) Working Effects of the Hose Coupling Fitting 10

The hose coupling fitting 10 described above affords the following working effects.

(4)-1 The hose coupling fitting 10 can be formed from the rod material 12A simply by a series of cold forging steps with no cutting step required, thus affording a simple working process and excellent productivity.

(4)-2 As shown in FIG. 3 and FIG. 4B, since the nipple hole 22a in inner diameter d3 is worked through reduction in diameter from the second pilot hole 22Aa having inside diameter d5 slightly larger than its original inside diameter d3, the forging ratio is low. Therefore, even a long narrow nipple hole 22a can be formed easily to the desired shape with a high degree of accuracy.

(4)-3 Since the second pilot hole 22Aa is subjected to working with the pin 43a shown in FIG. 6 inserted leaving a gap, the load bearing on the pin 43a can be reduced, facilitating the forging process.

(4)-4 Since the second pilot hole 22Aa is formed prior to working of the nipple portion 20 and so on in subsequent steps, the hole can be formed easily in the rod material in the absence of work hardening in the area, under conditions of reduced load on the punch and pin.

(4)-5 Since the second pilot hole 22Aa is formed so as to connect to the first pilot hole 14Aa subsequent to formation of the first pilot hole 14Aa, it can be shorter by the equivalent of the length of the first pilot hole 14Aa, and the load on the punch and pin can be reduced.

(4)-6 As shown in FIGS. 6 and 7, since the socket portion 18 and the nipple portion 20 are fabricated through expansion by forward extrusion of the workpieces 12D, 12E, the initial second pilot hole 22Aa can be shorter and formed easily.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A method of manufacturing a hose coupling fitting, which includes a coupling head portion having a connecting hole for connection to a pipe;

and a nipple portion having a nipple hole for connection to a hose, the method comprising:
   a plurality of sequentially performed cold forging steps carried out on a column-shaped rod material,
   wherein the plurality of steps include:
   forming a first pilot hole which extends along a center axis of the rod material from an end of the rod material to form the connecting hole, and forming a second pilot hole which extends along the center axis of the rod material from an opposite end of the rod material to form the nipple hole, wherein the second pilot hole is connected to the first pilot hole, and is formed with smaller diameter than the first pilot hole and larger diameter than the nipple hole; and
   forming the coupling head portion by forging a portion surrounding the first pilot hole, and forming the nipple portion by forging a portion surrounding the second pilot hole,
   wherein the step of forming the nipple portion comprises sub-steps, and each of the sub-steps includes (i) setting the rod material between a die and the pin of a punch by inserting the pin into the second pilot hole, and setting the die to an outer surface of the rod material, and (ii) then pressing the rod material by the pin in the die,
   wherein each of the sub-steps is carried out using first and second dies and first and second pins of punches respectively, and a diameter of the first pin is substantially the same as an inside diameter of the nipple hole, and the diameter of the second pin is equal to the inside diameter of the nipple.

2. The method of manufacturing a hose coupling fitting in accordance with claim 1, wherein
   d5/d3 is set to between 1.1 and 3, where d5 is the inside diameter of the second pilot hole, and d3 is the inside diameter of the nipple hole.

3. The method of manufacturing a hose coupling fitting in accordance with claim 2, wherein
   the second pilot hole is formed by preforming a recess along the center axis of the rod material, then punching the center portion along the center axis to connect with the first pilot hole.

4. The method of manufacturing a hose coupling fitting in accordance with claim 1, wherein
   the second pilot hole is formed by preforming a recess along the center axis of rod material, then punching the center portion along the center axis to connect with the first pilot hole.

5. The method of manufacturing a hose coupling fitting in accordance with claim 1, wherein during the step of forging the nipple portion, the pin is position to expand through at least a portion of the second pilot hole.

6. A method of manufacturing a hose coupling fitting which includes a coupling head portion having a connecting hole for connection to a pipe, and a nipple portion having a nipple hole for connection to a hose; the method comprising:
   a plurality of sequentially performed cold forging steps carried out on a column-shaped rod material,
   wherein the plurality of steps include:
   forming a first pilot hole which extends along a center axis of the rod material from an end of the rod material to form the connecting hole, and forming a second pilot hole which extends along the center axis of the rod material from an opposite end of the rod material to form the nipple hole, wherein the second pilot hole is connected to the first pilot hole, and is formed with smaller diameter than the first pilot hole and larger diameter than the nipple hole; and
   forming the coupling head portion by forging a portion surrounding the first pilot hole, and forming the nipple portion by forging a portion surrounding the second pilot hole,
   wherein the step of forming the nipple portion comprises sub-steps of (i) setting the rod material between a die and the pin of a punch by inserting the pin into the second pilot hole with gap between the pin and the second pilot hole, and setting the die to an outer surface of the rod material, and (ii) then pressing the rod material by the pin in the die, wherein a diameter of the pin is substantially the same as an inside diameter of the nipple hole.

7. The method of manufacturing a hose coupling fitting in accordance with claim 6, wherein
   d5/d3 is set to between 1.1 and 3, where d5 is the inside diameter of the second pilot hole, and d3 is the inside diameter of the nipple hole.

8. The method of manufacturing a hose coupling fitting in accordance with claim 7, wherein
   the second pilot hole is formed by preforming a recess along the center axis of the rod material, then punching the center portion along the center axis to connect with the first pilot hole.

9. The method of manufacturing a hose coupling fitting in accordance with claim 6, wherein
   the second pilot hole is formed by preforming a recess along the center axis of rod material, then punching the center portion along the center axis to connect with the first pilot hole.

10. The method of manufacturing a hose coupling fitting in accordance with claim 6, wherein during the step of forging the nipple portion, the pin is position to expand through at least a portion of the second pilot hole.

* * * * *